United States Patent [19]
Schwartzman

[11] Patent Number: 4,919,547
[45] Date of Patent: Apr. 24, 1990

[54] DYNAMICALLY SELF-ADJUSTED FLUID BEARING

[76] Inventor: Everett H. Schwartzman, Plaza Del Amo, Unit #309, Torrance, Calif. 90503

[21] Appl. No.: 347,996

[22] Filed: May 5, 1989

Related U.S. Application Data

[60] Continuation-in-part of Ser. No. 301,459, Jan. 25, 1989, which is a division of Ser. No. 35,627, Apr. 3, 1987, abandoned.

[30] Foreign Application Priority Data

Mar. 31, 1988 [EP] European Pat. Off. ........ 88302975.3
Apr. 4, 1988 [JP] Japan .................................. 63-82826

[51] Int. Cl.$^5$ ............................................. F16L 32/06
[52] U.S. Cl. ..................... 384/110; 384/100; 384/107; 384/124
[58] Field of Search ............... 384/100, 107, 110, 111, 384/114, 118, 119, 124

[56] References Cited

U.S. PATENT DOCUMENTS

| | | | |
|---|---|---|---|
| 2,711,934 | 6/1955 | Rickenmann | 384/110 |
| 3,476,451 | 11/1969 | Schwartzman | 384/110 |
| 3,674,355 | 7/1972 | Yearout et al. | 384/110 |
| 3,917,366 | 11/1975 | Mason | 384/110 |

Primary Examiner—Thomas R. Hannon
Attorney, Agent, or Firm—Beehler & Pavitt

[57] ABSTRACT

An essentially completely and automatically self-adjusting fluid bearing assembly includes at least a front and rear bearing cone mounted for rotation with a driven shaft. Associated with each cone is a shell, such that a fluid gap exists between the shell and the associated cone. One of the shells, usually the rear shell, is held in place and biased by a spring or the like to urge the shell towards the associated cone to form the proper fluid gap while the other shell is provided with a differential diameter. Due to the differential diameter, the fluid pressure operates to urge the front shell towards the front cone thus keeping the fluid gaps in the proper fluid gap dimensions. Various structures are described.

12 Claims, 2 Drawing Sheets

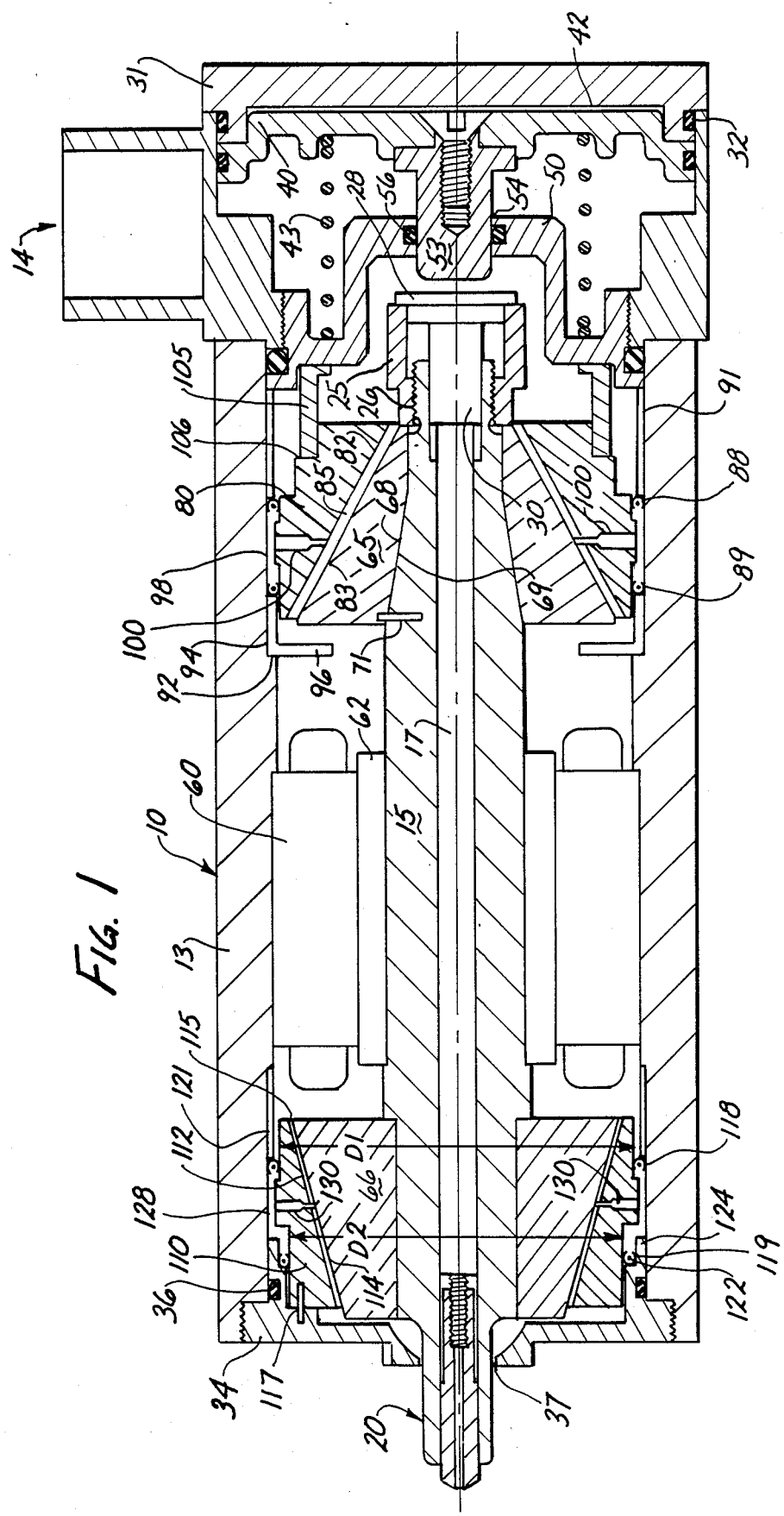

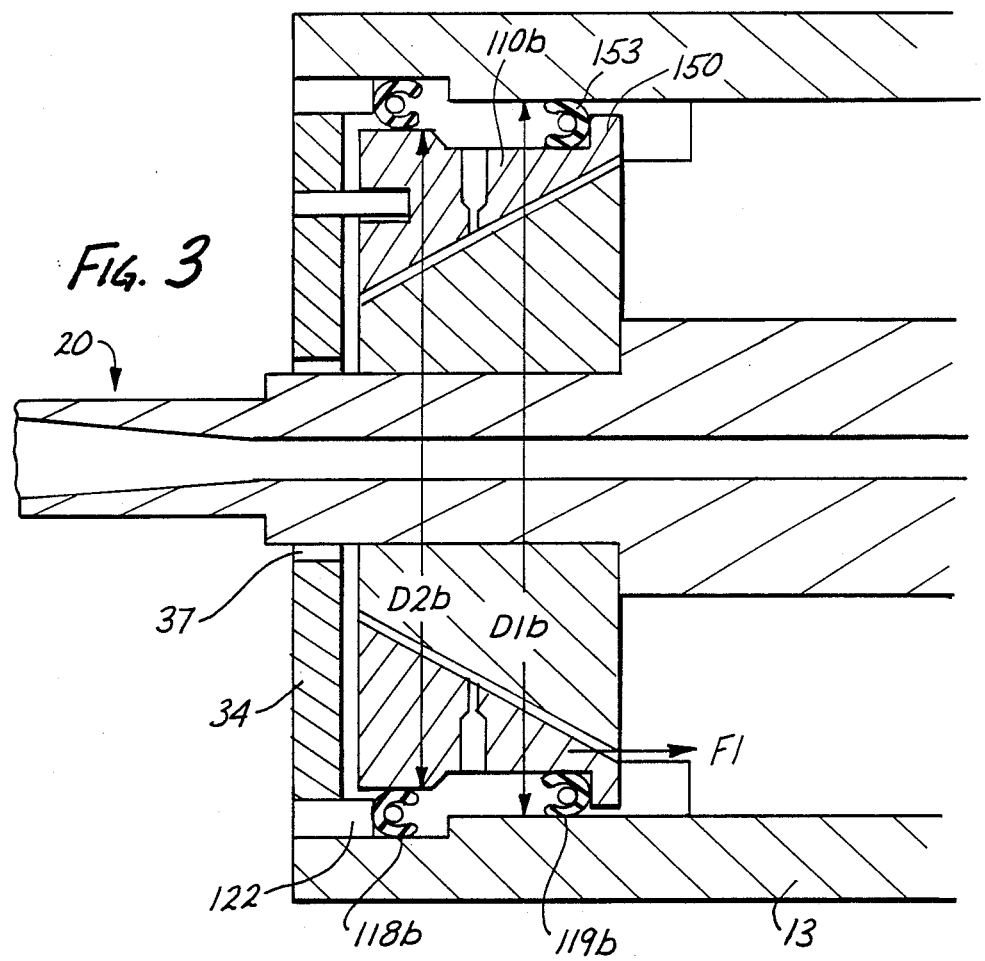
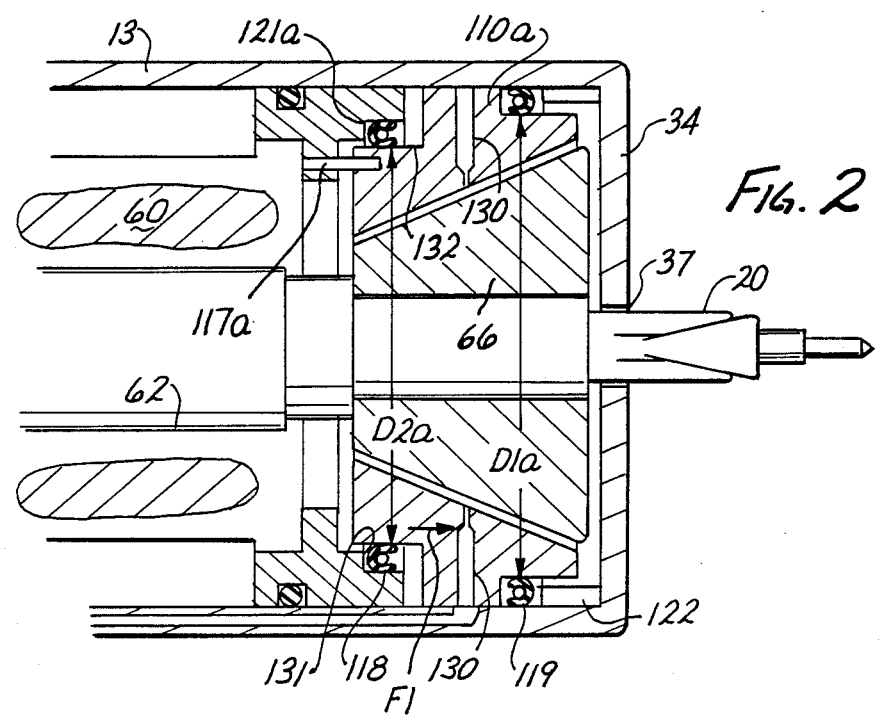

DYNAMICALLY SELF-ADJUSTED FLUID BEARING

RELATED APPLICATION

This application is a continuation-in-part of application Ser. No. 301,459, filed Jan. 25, 1989 which in turn is a division of Ser. No. 035,627, filed Apr. 3, 1987, now abandoned, and whose disclosure is incorporated herein as though fully set forth herein.

FIELD OF INVENTION

The present invention relates to a fluid bearing assembly and more particularly to a completely and automatic axially self-adjusting fluid operated bearing system in which there is a space between the relatively rotating parts which are supported in spaced relation by a fluid, and wherein the bearing system is especially adapted for use at relatively high rotational speeds.

DESCRIPTION OF THE PRIOR ART

Reference is made to the above identified application and the discussion of the prior art and the background of the invention, all of which is applicable to the present invention and incorporated herein by reference.

As is apparent from the prior application identified, one of the major problems with fluid operated bearings, in contrast to roller bearings and the like, is maintaining dynamic balance of the relatively rotating parts. This is so because the relatively stationary and rotating parts essentially ride on a fluid film such as a gas or air. It is also the case that because the gap between the relatively rotating parts is a fluid gap, the rotating part may move axially, orbitally (tilting from one end to the other) or radially (epicyclically) with respect to the relatively nonrotating part. Quite obviously, for use of an air bearing as a spindle for precision rotating components such as a spindle for a circuit board drilling or routing machine or the like, it is important that the rotating part rotate around a true center axis of rotation, as fully explained in the prior application previously identified and as to which reference is made.

While the above patent application describes a fluid bearing system having three axes of freedom and describes important structures for assuring proper performance of such a bearing, the present invention addresses an important improvement over the structures previously described in that by control of certain geometry, there is essentially complete axial self-adjusting of the bearing system such that the fluid gaps are automatically kept at the correct gap clearances for proper dynamically balanced operation of the bearing system.

BRIEF DESCRIPTION OF THE PRESENT INVENTION

The bearing of this invention is fluid operated and includes a rotating shaft on which is mounted front and rear cones which are preferably externally tapered, the shaft being driven by a motor or turbine or other suitable drive means. The shaft is supported in a housing which in turn supports a front and rear shell, or journal, such that a clearance exists between the respective shells and cones. The shells are mounted within the housing such that the shells are free to move axially, radially or orbitally a relatively small amount, such that there is formed a clearance or a fluid gap between the opposed surfaces of the shell and the associated cone, such that the bearing literally rides on air. The shells do not rotate during operation of the bearing system and include inner surfaces which essentially match the conical outer surface configuration of the cones. The inner surface of the shells are also impervious to the passage of fluid, such as air, but the shells are provided with passageways to permit flow of pressurized fluid into the gap.

The dynamics of the operation of a fluid or gas bearing are such that variations in operation, due to any number of different operating and dynamic balance conditions, tend to cause the gap(s), usually fluid gaps, to change dimension and which tends to cause instability during operation even if provision is made to permit movement of the shells, supported in the housing by relatively low frictional seals or supporting members and which permit relative movement between the shells and the shell supporting structure, the latter typically supported in the housing.

Perhaps the greatest factors which effect operation of the bearing system are thermal effects resulting from the heat generated during bearing operation and stress effects due to the relatively high rotational speed. Typically, the bearings of this invention operate at rotational speeds of from between about 10,000 rpm and about 120,000 rpm or higher. Even relatively small changes in dimension, for example of the shells, shaft and the like, may cause fluid gap dimension changes which may, in turn, adversely affect the rotational dynamics of the bearing system as a whole.

By this invention, provision is made to effect virtually automatic axial self-adjustment of the bearing system as a whole by utilizing a differential area so as to bias one shell, usually the front shell, by fluid pressure while the other shell, usually the rear shell, is held in position by a biasing means such as a spring which exerts an axial force to maintain the rear shell properly positioned to establish the proper gap between the rear cone and the rear shell, In effect, the one shell is spring biased towards the associated bearing cone while the other shell, because of the differential in area, as will be described, is pressure biased towards its associated cone.

In one form, one shell is spring biased in one direction due to the orientation of the shell and associated cone while the other shell is biased in the opposite direction by fluid pressure operating on the differential area, again due to the orientation of that cone and associated shell. In any case, the one shell is spring biased towards its associated cone and the other shell is pressure force biased because of the differential diameter due to the fluid pressure, towards its associated cone. The result is that each of the bearing cones and their associated shells are maintained in their optimum relative positions of optimal relative fluid gap dimensions regardless of the thermal expansion effects of the various components of the total bearing system. A further complication is that the thermal effects may vary during operation of the bearing and are generally related to the rotational speed of the fluid bearing, especially if an electrical motor is used as the power source for rotating the shaft. This is true even if a liquid is used in an attempt to keep the bearing cool during operation.

It is thus a primary object of the present invention to provide an improved fluid operated bearing system in which the bearing system is fully and completely and automatically axially self-adjusting.

Another object of this invention is to provide a bearing system of the type described in which thermal effects tend to cause dynamic changes in the operation of the bearing system and wherein provision is made for automatically axially self-adjusting the bearing system so as to maintain proper operation thereof by compensating for such thermal changes.

Another object of this invention is to provide a fluid operating bearing having spaced bearing elements on a rotatable shaft in which shells, associated with the bearing elements, are biased by a spring in one case and by fluid pressure in the other case, towards the associated bearings in order to maintain automatically the proper gap between the bearing and shell pairs.

These and other objects are achieved in accordance with the present invention as will be described in the following detailed description and accompanying drawings which illustrate preferred forms of the invention for purposes of illustration thereof and which are not to be construed as limiting the present invention.

BRIEF DESCRIPTION OF THE DRAWINGS

FIG. 1 is a view in section of a typical fluid operated bearing system in accordance with the present invention in which the bearing system is used in a relatively high speed spindle;

FIG. 2 is a fragmentary view, in section, of the front end of the bearing assembly in accordance with the present invention; and FIG. 3 is a fragmentary view, in section, of the front end of a modified form of bearing assembly in accordance with the present invention.

DETAILED DESCRIPTION OF THE INVENTION

Referring to FIG. 1, a preferred form of the fluid bearing 10 is illustrated in the form of a high speed spindle assembly which includes a housing 13 of steel, for example, the latter provided with a side opening 14 through which electrical wires may pass. Located within the housing which also includes passageways for cooling liquid, not shown and for flow of fluid, is a hollow shaft 15. The hollow shaft includes a drawbar 17, on one end of which is a well known tool holding collet assembly generally designated 20.

The drawbar is driven by and moveable axially within the hollow shaft. In the retracted position, as shown, the collet grips a tool, the drawbar being biased in the retracted position by a machined spring 25 which is threaded on the other end 26 of the shaft as illustrated. Further details of the machined spring are described in my U.S. Pat. No. 4,640,653 issued Feb. 3, 1987 and U.S. Pat. No. 4,790,700 issued on Dec. 13, 1988. The end of the drawbar includes a flat 28 which bears against the spring 25 and a driving connection between the shaft 15 and the drawbar 17 is provided by a hexagonal opening in the shaft and a mating hexagonal outer portion of the shaft as indicated at 30, although a splined connection may be used if desired.

The rear end of the housing 13 is closed by a cap 31, sealed by an o-ring 32, while the front end of the housing is also sealed by a screw cap 34 and an o-ring seal 36, the front cap including an aperture 37 through which front end of the shaft and the collet assembly extend, as shown. The rear end of the housing includes a standard collet actuating assembly such as an axially moveable pneumatically operated piston 40. Pressure in the space 42 between the piston 40 and the cap 31 forces the piston towards the front of the bearing against a spring 43, one end of which bears against the back of the piston and the other end of which bears against an adjusting nut 50 which is threaded to the housing. The piston carries a bottom 53 which is slidable in an aperture 54 of the nut and sealed by an o-ring 56. The button contacts the flat 28, urging the drawbar forward to release the collet; upon release of the pressure in space 42, the spring 43 urges the piston to the rear while the spring nut 25 urges the drawbar to the rear.

In the form illustrated, power to drive the shaft is provided by a stator 60 supported in the housing and a rotor 62 mounted on the shaft. The shaft 15 also carries axially spaced conical bearing elements 65 and 66, the rear and front bearing elements, respectively, which may, for example be made of hard anodized aluminum. The rear conical bearing 65 includes an inner tapered opening 68 which mates with the correspondingly tapered portion 69 of the shaft, as shown, the taper being about 8 degrees to form a gripping rather than locking taper. The rear bearing is axially slotted and pinned to the shaft by a pin 71, such that the rear bearing cone 65 rotates with the driven shaft, but upon assembly or removal, may be moved axially of the shaft.

Associated with the rear bearing cone is a rear shell 80, the latter preferably totally of graphite and treated to be impervious to the flow of gas through the body of the shell and not supported in an aluminum housing. As shown, the rear bearing cone is oriented such that the small diameter end thereof faces to the rear while the associated shell includes a conical aperture 82 which basically matches the contour of the outer surface 83 of the rear cone, thus providing a fluid gap 85 therebetween when fluid pressure is introduced into the assembly. The rear shell is supported within but spaced from the housing by two axially spaced spring biased continuous resilient seal elements 88 and 89 which may, for example, be lip seals of Teflon as described in detail in the patent application previously referred to, and which fully encircle and contact the outer surface of the shell 80.

Positioned between the seal element 88 and the back side of the adjusting nut is an annular seal spacer 91 which may also be a machined spring, while located in a shoulder 92 in the inside surface of the housing is a second seal spacer 94 having an radially inwardly extending section 96 which assists in removing the rear cone from the shaft during disassembly. When fluid is introduced into the bearing assembly through an inlet on the housing an through passageways in the housing, not shown, fluid flows into the annular chamber 98 between the seals 88 and 89 and through passageways 100 provided in the shell 80 for flow into the fluid gap 85. The pressure tends to force the seal elements axially apart and against the associated spacers. Located between the spacer 91 and the spring nut 25 is an annular main spring 105, one end of which bears against the back side of the adjusting nut and the other end of which bears against the back face and against a shoulder 106 of the rear shell 80.

The main spring may have a spring constant of about 1,500 pounds per inch or greater and functions to hold the rear shell in place with respect to the rear cone. Associated with the front cone 66, which is mounted on the shaft by an interference fit, is a front shell 110, the latter having a tapered inner surface 112 which essentially matches the contour of the outer surface 114 of the rear cone to provide a fluid gap 115 therebetween when fluid is introduced into the bearing assembly. In the form illustrated, the front cone is oriented such that the small diameter end faces to the front or away from the rear cone. The front shell is pinned to the inside of the front housing as indicated at 117 so that during operation, the front shell does not rotate. During assembly and disassembly, the front shell can be rotated with the front cap.

The front shell is supported within but spaced from the housing by two axially spaced spring biased continuous resilient seal elements 118 and 119 which may, for example, be lip seals of Teflon as described in detail in the patent application previously referred to, and which fully encircle and contact the outer surface of the shell 110.

Positioned between the seal element 118 and received in a shoulder in the housing is an annular seal spacer 121 which may also be a machined spring, while a shoulder 122 in the inside surface of the front cap forms a second seal spacer 124. When fluid is introduced into the bearing assembly, fluid flows into the annular chamber 128 between the seals 118 and 119 and through passageways 130 provided in the front shell 112 for flow into the fluid gap 115. The pressure tends to force the seal elements axially apart and against the associated spacers. The front shell is made of the same material as the rear shell, while the front cone is made of the same material as the rear cone. The use of these respective materials prevents galling should the cones contact the respective shells.

The structure as above described is basically that previously described in the previously identified patent application of which this is a continuation in part. Yet, there are differences. In order to achieve automatic axial self-adjusting, the rear shell is held in place by being biased by the main spring towards the associated bearing cone. This establishes the fluid, preferably gas, gap between the rear cone and the rear shell. Generally, the fluid pressure does not provide the axial force to position the rear shell properly, this is provided by the main spring. In the case of the front shell, however, the situation is different.

Referring again to FIG. 1, the front cone is provided with a differential diameter, i.e., the diameter D1 is greater than the diameter D2. Thus, the area of D1 is $A1 = pi/4 \times D1^2$, while the area of D2 is $A2 = pi/4 \times D2^2$. The difference in area, $A1 - A2$, is the area on which the pressure of the fluid acts and creates a force equal to $F = P \times (A1 - A2)$, where F is the force, P the fluid pressure and A1 and A2 as described. The result is that the force is in an axial direction tending to force the shell towards the associated cone, i.e., the open wide end of the shell is forced over the narrow end of the cone. The result is that the spring assists in forming the proper gap at the rear shell-cone combination and the force generated by the pressure and differential diameter tends to form the proper gap at the front shell-cone combination thereby establishing the proper fluid gap dimensions in the respective gaps.

Should thermal expansion or stress cause any change or changes in dimension, the system automatically compensates since the system is self-adjusting axially. It is also to be noted that the ability of the bearing to respond as may be needed for automatic accurate axial self-adjustment is in part related to the relatively low friction of the seals associated with the front shell. The friction of those seals is between 3 and 6 pounds in a bearing in which the major diameter of the front cone is about 1.628 inches while the major diameter, D1 of front shell is 1.775 inches, with a minor diameter, D2, of 1.668 inches. With these dimensions, the bearing will support about 80 pounds of axial thrust and the biasing thrust of the front shell is between 20 to 26 pounds for proper operation.

FIG. 2 illustrates a modified form of the front shell for use in bearings to be used for spindles for drilling and routing. In such a structure, the front and rear cones are oriented so that the minor diameters are facing each other and the major diameter of the cones are facing away from each other. In this case the shells are such that the small diameter openings face each other and the large diameter openings face away from each other. The result of this change is to result in the spring for the front bearing exerting a force in the opposite direction. The main spring 105 is located on the shoulder 96 of the seal spacer at one end and bears against the front face of the rear shell as will be apparent from an examination of FIG. 1. Thus, the spring still forces the shell towards the cone, but since the cone is oriented with the major diameter facing to the rear, the spring urges the associated shell to the rear.

As shown in FIG. 2, wherein the same reference numerals have been used for basically the same parts, the front bearing and shell assembly are shown to illustrate this form of the invention. The larger diameter D1a is at the front end of the shell 110a, i.e., nearer to the front end cap 34, with the front seal 119 positioned against the shoulder 122 of the front cap, as described. In this form, the rear seal spring holder 121a, sealed to the housing 13 includes a shoulder 131 which receives the rear seal element 118 and the shell, the shell 110a being pinned to the rear spring holder 121a by a pin 117a. Here the minor diameter is D2a, at the reduced diameter 132 at the rear of the shell 110a, while the major diameter is at D1a. Since the differential diameters result in an effective working area which faces to the front of the bearing, i.e., towards the major diameter of the cone associated with the front shell, the force exerted for axial adjustment is directed towards the large diameter end of the cone in order to position the shell properly on that cone, i.e., towards the front of the assembly, indicated by the arrow F1, as is required.

FIG. 3 illustrates another form of the front shell and cone assembly which is a variant of that illustrated in FIG. 1. Again the same reference numerals have been used for the same parts. In this form, the rear end of the front shell 110b is provided with a radially extending shoulder 150 which is of a dimension to clear the inside diameter of the housing at that region. The rear seal 119b of the front shell bears against that shoulder while the front seal 118 bears against the shoulder 122 of the front cap. In this form, the major diameter is D1b which is effectively the major diameter of the shell and the small increment 153 of the rear seal which extends radially beyond the shoulder 150 and between the radial end of the shoulder and the opposite inner wall of the housing. The minor diameter D2b, which is less than the major diameter, extends to the region just to the rear of the front seal 118b of the front shell. Again, the result is that the differential diameter creates a force which biases the front shell towards the large diameter end of the cone, i.e., to the rear, again providing the self-adjustment as described.

In comparing the structure of FIG. 1 with that of FIG. 3, it is apparent that since the front shell is the moveable component, the friction is between the inside peripheral component of the seals and the outer surface of the shells. In the case of the structure of FIG. 3, since the front shell is axially moveable, the friction is between the inside peripheral surface of the front seal 118b and the outside peripheral surface of the seal 119b, i.e., the inside wall of the housing which is smooth steel. This may result in less frictional resistance with respect to movement of the seals. In the case of the structure of FIG. 1, the sliding friction is basically between the inside peripheral region of the seals and the opposing surface of the shell. Since the shell is of graphite, the sliding friction is relatively low, as already noted.

There has thus been described various structural arrangements for achieving automatic and essentially complete axial self-adjustment of the gap dimensions of a fluid, and preferably gas operated bearing, and which achieves and exhibit the advantages as set forth herein.

What is claimed is:

1. A self-adjusting fluid operating bearing system for operation at relatively high rotational speeds, comprising:

housing means containing rotatingly driven shaft means, at least first and second spaced bearing elements each having an outer conical surface thus forming an end having a major and a minor diameter and mounted for rotation with said driven shaft means, shell means cooperating with each of said first and second conical bearing elements and being mounted within said housing means and each including an outer surface, and an inner conical surface facing the outer conical surface of the associated bearing elements and forming a gap therebetween, low friction seal means cooperating with said shell means for resiliently mounting said shell means with respect to said housing means, means to effect flow of fluid into said gap between each said bearing element and the associated shell means, means biasing one of said shell means towards the major diameter of the associated bearing element, the other shell means including at least a portion of the outer surface which has a differential diameter so as to provide an area on which fluid may act to create a force urging said other shell axially in said housing, means to flow fluid into contact with said portion of the outer surface of said shell which has said differential diameter, and said force operating on the said area of said other shell means being operative to urge the latter in an axial direction towards the major diameter of the cone associated with said associated shell means whereby the said gaps between said shell means and the associated bearings are automatically self-adjusting in gap dimension.

2. A self-adjusting fluid operating bearing system as set forth in claim 1 wherein said bearing elements are oriented such that the minor diameter ends thereof face in opposite directions and wherein said means to bias one of said shells means operates to bias that shell means towards the other shell means.

3. A self-adjusting fluid operating bearing system as set forth in claim 1 wherein said means to bias one of said shell means operates to bias that shell means away from the other of said shell means.

4. A self-adjusting fluid operating bearing system as set forth in claim 1 wherein said first and second bearings elements form respectively a rear and front bearing element, said means to bias one of said shell means being operative to bias the shell means cooperating with said rear bearing element in a direction towards said front bearing element, and said shell means having a differential diameter being associated with said front bearing element such that the axial force is directed towards said rear bearing element.

5. A self-adjusting fluid operating bearing system as set forth in claim 1 wherein said bearing elements form a front and rear bearing element, said bearing elements being oriented such that the minor diameter end of the front bearing faces to the front of said bearing and the minor end of the rear bearing element faces to the rear of said bearing system, said shaft being hollow, drawbar means located within said hollow shaft and being driven thereby and including collet means on one end thereof operative in one position to grip a tool and in another to position release a tool, and means to effect movement of said drawbar means between said positions.

6. A self-adjusting fluid operating bearing system as set forth in claim 1 wherein said biasing means is a machined spring.

7. A self-adjusting fluid operating bearing system as set forth in claim 1 wherein said shell means are solid graphite material treated such that at least the surface portion thereof facing the associated cone is impervious to the flow of fluid.

8. A self-adjusting fluid operating bearing system as set forth in claim 1 wherein said bearing elements form a front and rear bearing element, said bearing elements being oriented such that the major diameter end of the front bearing faces to the front of said bearing system and the major diameter end of the rear bearing element faces to the rear of said bearing system, said shaft being hollow, drawbar means located within said hollow shaft and being driven thereby and including collet means on one end thereof operative in one position to grip a tool and in another to position release a tool, and means to effect movement of said drawbar means between said positions.

9. A self-adjusting fluid operating bearing system as set forth in claim 1 wherein said seal means includes two seal elements for each shell, the seal elements for the shell means having the differential diameter including one seal element which frictionally slides on the housing and another seal element which frictionally slides on the outer surface of the shell means.

10. A self-adjusting fluid operating bearing system as set forth in claim 1 wherein said seal means includes two seal elements for each shell, the seal elements for the shell means having the differential diameter and wherein each such seal element frictionally slides on the outer surface of the shell means.

11. A self-adjusting fluid operating bearing system as set forth in claim 1 wherein said fluid is a liquid.

12. A self-adjusting fluid operating bearing system as set forth in claim 1 wherein said fluid is a gas.

* * * * *

UNITED STATES PATENT AND TRADEMARK OFFICE
CERTIFICATE OF CORRECTION

PATENT NO. : 4,919,547

DATED : April 24, 1990

INVENTOR(S) : Everett H. Schwartzman

It is certified that error appears in the above-identified patent and that said Letters Patent is hereby corrected as shown:

TITLE PAGE:

[60] Related U.S. Application Data

Delete the word "abandoned".

Signed and Sealed this

Sixteenth Day of July, 1991

Attest:

HARRY F. MANBECK, JR.

*Attesting Officer*  *Commissioner of Patents and Trademarks*